United States Patent [19]

Shimbo

[11] Patent Number: 4,599,716
[45] Date of Patent: Jul. 8, 1986

[54] AUTOCHANGER TYPE DISC PLAYER
[75] Inventor: Takao Shimbo, Yokohama, Japan
[73] Assignee: Kabushiki Kaisha Toshiba, Japan
[21] Appl. No.: 686,374
[22] Filed: Dec. 26, 1984
[30] Foreign Application Priority Data Dec. 27, 1983 [JP] Japan .................. 58-244461

[51] Int. Cl.⁴ .................. G11B 17/04; G11B 17/22
[52] U.S. Cl. .................. 369/36; 369/39
[58] Field of Search .................. 369/34, 36, 37, 38, 369/39

[56] References Cited
U.S. PATENT DOCUMENTS 2,946,594  7/1960  Staar .................. 369/39
3,967,828  7/1976  Topciski .

FOREIGN PATENT DOCUMENTS 1048712  1/1959  Fed. Rep. of Germany .
57-181471  11/1982  Japan .

Primary Examiner—Steven L. Stephan
Attorney, Agent, or Firm—Finnegan, Henderson, Farabow, Garrett & Dunner

[57] ABSTRACT

An autochanger type optical compact disc player includes a disc tray for holding a large number of discs in close proximity, a disc playback section and a disc transferring section for transferring the disc between the disc tray and the disc playback section. The disc tray includes a plurality of disc holding grooves and partition walls for dividing the disc holding grooves from each other. The bottoms of the disc holding grooves are curved in an arc of a radius corresponding to the radius of the discs, and the upper edges of the partition walls incline toward the direction of movement of the discs into the disc holding grooves with respect to the tangent of the periphery of a disc at any point where the periphery of the disc crosses with the upper edges.

2 Claims, 24 Drawing Figures

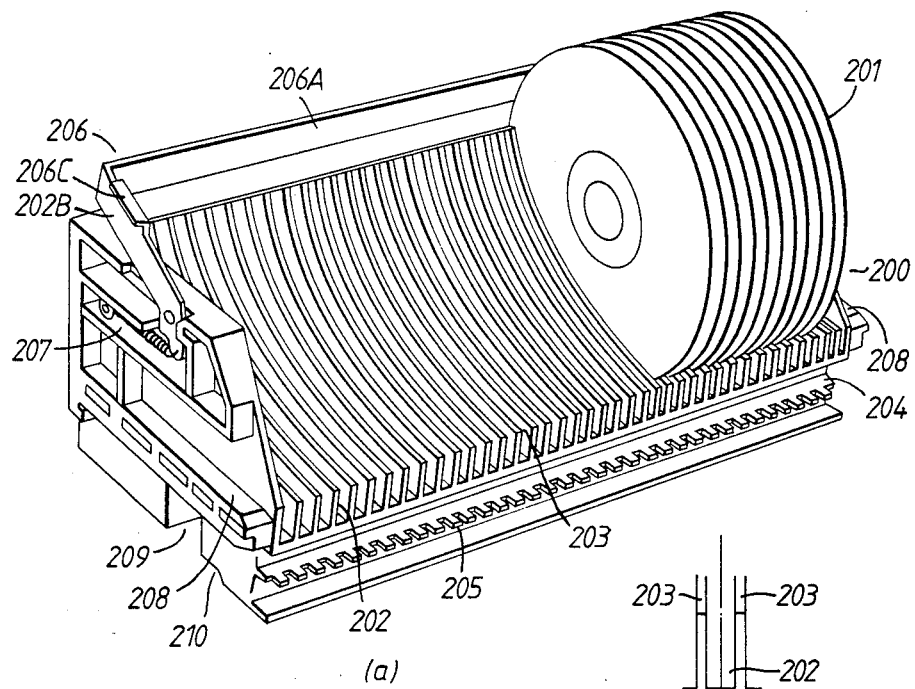
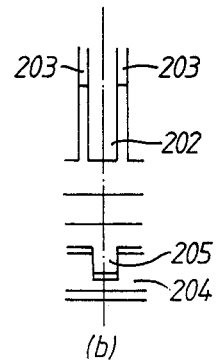
FIG. 3.
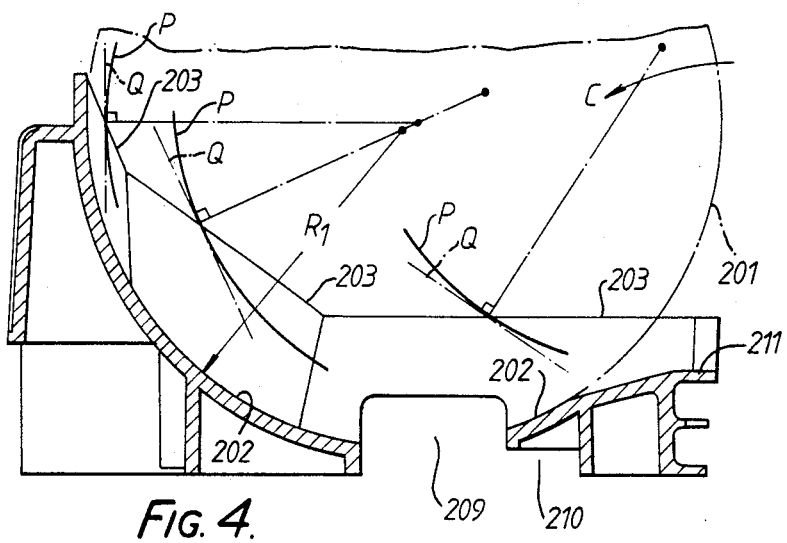
FIG. 4.

AUTOCHANGER TYPE DISC PLAYER

BACKGROUND OF THE INVENTION

The present invention relates to an autochanger type disc player suited to optical compact discs, for example.

Recently, in the field of audio equipment, digital audio disc playback systems utilizing pulse code modulation (referred as PCM hereinafter) technology to play back sound as faithfully as possible have been developed. Of these systems, playback systems employing optical compact discs have been especially popular.

Specifically, the optical compact disc used in the playback system consists of a disc which is made from a transparent resin and has a diameter of 12 cm and a thickness of 1.2 mm. The compact disc has a thin metal film deposited on at least one surface thereof, and pits or depressions are formed in the thin metal film, corresponding to digitized (pulse code-modulated) data so that logic 1 and 0 may produce different light reflectivities. When a signal is read out from the compact disc, the compact disc is rotated at a variable rotation frequency of 200 to 500 rpm so that an optical pickup incorporating a semiconductor laser or photoelectric transducing device tracks the information storage area of the compact disc with constant linear velocity while moving radially from the inner side toward the outer side.

The compact disc stores such a large quantity of information that it permits a stereophonic playback for about one hour even if only one side of the compact disc is used for information storage. It has been theoretically proved that the compact disc is much superior to the conventional analog phonograph record in both playback characteristics and recording density.

In view of the excellent characteristics of the compact disc, it has been suggested to use compact discs in an automatic multi-disc playback system for business use. In particular, this corresponds to a jukebox or an orchestra accompaniment playback apparatus (that is known as "karaoke" apparatus in Japan) which is put into practical use with analog phonograph records. It is possible to realize the automatic multi-disc playback system by means of an autochanger type disc player. Known autochanger type disc players of this kind are complex in structure and bulky, however, partially because they have been designed for use with analog phonograph records. Therefore, the conventional disc players present control problems. Further, the requirement of more certain operation limits the number of discs held within such a disc player. Another problem is the long time it takes to exchange one disc for another. Also, a pusher-type mechanism has been used to take a disc from storage to a playing position. The pusher mechanism passes through the stack of discs and requires the discs to be separated by an unnecessarily wide space to accommodate the bulk of the pusher mechanism.

For these reasons, if the conventional autochanger type disc player is applied to compact discs without changing the essential structure of the disc player, there arise numerous problems. Hence, the development of an autochanger type disc player suited for compact discs is a matter of urgency.

The same circumstances apply to video disc players and optical disc document file systems which are soon to be put into practical use.

SUMMARY OF THE INVENTION

In view of the foregoing, it is an object of the present invention to provide an autochanger type disc player which is capable of transferring discs between a disc playback section and a disc storage section.

Another object of the present invention is to provide an autochanger type disc player which is capable of exchanging one compact disc selected for playback operation for another at a high speed, is simple in structure, and is able to operate reliably.

Still another object of the present invention is to provide an autochanger type disc player which has an improved mechanism for moving discs between a disc storage section and a disc playback section.

Another object of the present invention is to provide an autochanger type disc player which is capable of selecting with certainty a predetermined disc among many discs stored close to each other in a disc storage section.

According to one aspect of the present invention, the autochanger type disc player is adapted to automatically select a desired disc from a disc storage section or a tray holding a number of discs therein and to supply it to a disc playback section in such a way that the selected disc is able to be played, and which comprises: a disc playback means; a disc storage means for holding a plurality of discs upright and parallel to each other therein and for allowing the discs to go therein or thereout, the disc storage means including a plurality of disc holding grooves and partition walls dividing the disc holding grooves from each other, the bottom of each of the disc holding grooves being curved in an arc of a radius approximately equal to the radius of the discs and the upper edges of the partition walls being inclined toward the direction of movement of the discs into the disc holding grooves with respect to the tangent of the periphery of one of the discs at any point where the periphery intersects the upper edges, the discs going into the disc holding grooves smoothly without the peripheries of the discs running against the upper edges; and a disc transferring means for transferring the discs between the disc playback means and the disc storage means.

Additional objects, advantages and features of the present invention will become apparent to persons skilled in the art from a study of the following description and of the accompanying drawings.

BRIEF DESCRIPTION OF THE DRAWINGS

FIGS. 3(a) and 3(b) are perspective and enlarged front views showing a tray shown in FIG. 2;

FIG. 4 is a sectional view specifically showing details of the tray shown in FIG. 3 along a disc holding groove;

DESCRIPTION OF THE PREFERRED EMBODIMENT

Figure 1:
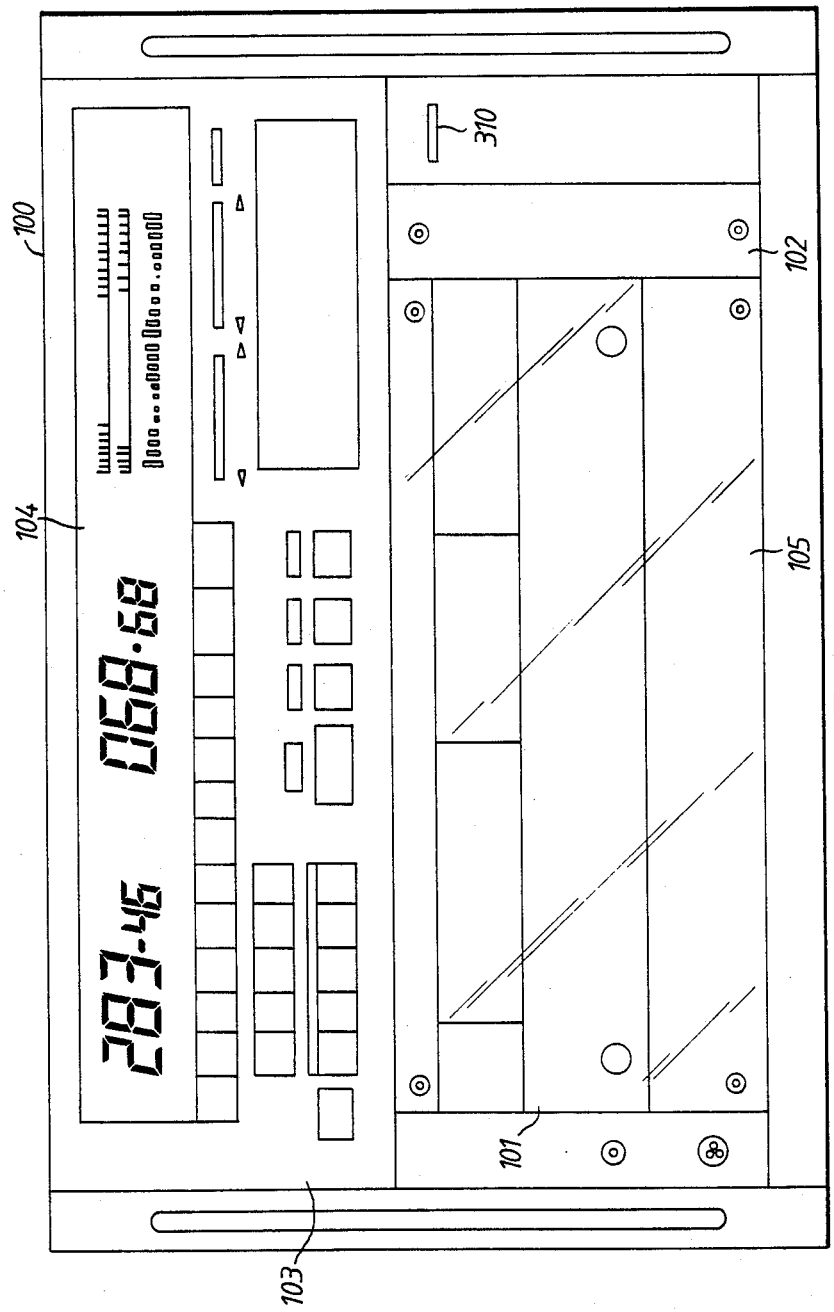
FIG. 1 is a front external view of an autochanger type disc player according to the present invention.

The present invention will now be described in detail with reference to the accompanying drawings: FIG. 1 to FIG. 24. Throughout the drawings like reference numerals and letters are used to designate like or equivalent elements for the sake of simplicity of explanation.

Referring now to FIG. 1, there is shown a front view of an autochanger type disc player according to the present invention. A housing 100 of the autochanger type disc player has in its front a disc storage section 101, a disc temporary loading section 102, an operation control section 103 and a display section 104. The disc storage section 101 is covered by a cover 105. The disc temporary loading section 102 is slidably mounted to the housing 100 so as to protrude outward of the housing 100.

Before describing in detail components of the disc player, individually, their fundamental structures and functions will be described by referring to FIG. 2. There is shown the autochanger type disc player with the housing 100 removed. This disc player includes a main chassis 106, a left-side chassis 107 and a right-side chassis 108. Located among these members in the manner described later are the disc storage section 101 for housing a tray 200, disc temporary loading mechanism 300 for the disc temporary loading section 102 and a disc playback unit 400. The tray 200 is able to store a plurality of discs 201 arranged uprightly in a row along the longitude direction of the tray 200 in confronting their surfaces with each other. On the other hand, the disc temporary loading mechanism 300 is able to store a single disc 201. The tray 200 is removable from the disc storage section 101 through a port covered by the cover 105, so that the discs 201 are wholly able to be loaded in or unloaded from the disc storage section 101 together with the tray 200. On the other hand, the disc 201 on the disc temporary loading mechanism 300 is loaded in or unloaded from the disc temporary loading mechanism 300 through the disc temporary loading mechanism 300 sliding into or out of the disc temporary loading section 102. In the disc player the disc 201 stored in the disc temporary loading section 102 is also arranged in the same line with the discs 201 in the tray 200. The disc playback unit 400 is slidable along the line of the discs 201 and has a disc search driving mechanism 500, a disc transferring mechanism 600 and a disc playback mechanism 700. The disc playback unit 400 is located at a selected one of the discs 201 by given disc access information. The disc transferring mechanism 600 picks up and transfers the selected disc 201 into the disc playback mechanism 700, and then the disc playback mechanism 700 plays backs the selected disc 201. After a playback of the selected disc 201 the disc transferring mechanism 600 transfers the disc 201 back to the position where the selected disc 201 was stored previously.

Referring now to FIGS. 3(a) and 3(b), the tray 200 is described in detail. Recessed in the upper part of tray 200 are a plurality of disc holding grooves 202 divided from each other by partition walls 203. Each of the disc holding grooves 202 has a bottom corresponding in shape to the periphery of the disc 201 and contacting about a quarter arc of the periphery. The tray 200 has further a slitted flange 204 in its front end along the longitude direction of the tray 200. The slitted flange 204 includes a plurality of slits 205 corresponding to the disc holding grooves 202. The tray 200 has a disc retention lever 206 which is pivotally mounted to the tray 200. The disc retention lever 206 has a cross-bar portion 206A along the longitude direction of the tray 200 and a pair of side portions 206B which extend parallelly from the end of the cross-bar portion 206A in the same direction and are pivotally mounted to a side wall of the tray 200. The side portions 206B include flanges 206C which protrude outward from the side portions 206B. The disc retention lever 206 is biased by a spring 207 mounted between the end of the side portion 206B and the side wall of the tray 200 in the clockwise direction in the drawing (in FIG. 3, the disc retention lever 206 is shown in a state pivoted against the spring 207). Each of the side walls of the tray 200 includes a guide groove 208.

Referring now to FIG. 4 which shows a section of the tray 200 along the disc holding groove 202, in the bottom of the tray 200 is formed a recess 209 and an engaging step 210 along the longitude direction of the tray 200 so that each disc holding groove 202 opens into recess 209. The disc holding grooves 202 are curved in an arc of radius $R_1$ corresponding to the radius of the disc 201. Each of the partition walls 203 has an upper edge which inclines toward the back of the tray 200 with respect to the tangent line Q of the periphery P of the disc 201 at any point where the periphery P crosses with the upper edge of the partition wall 203. Thus, the disc 201 is allowed to roll into the disc holding groove 202 smoothly without the periphery of the disc 201 running against the upper edge of the partition wall 203. Towards the front end of the tray 200, each disc holding groove 202 gradually rises to form a front bank 211 which prevents the disc 201 in the disc holding groove 202 from falling out.

Figure 5:
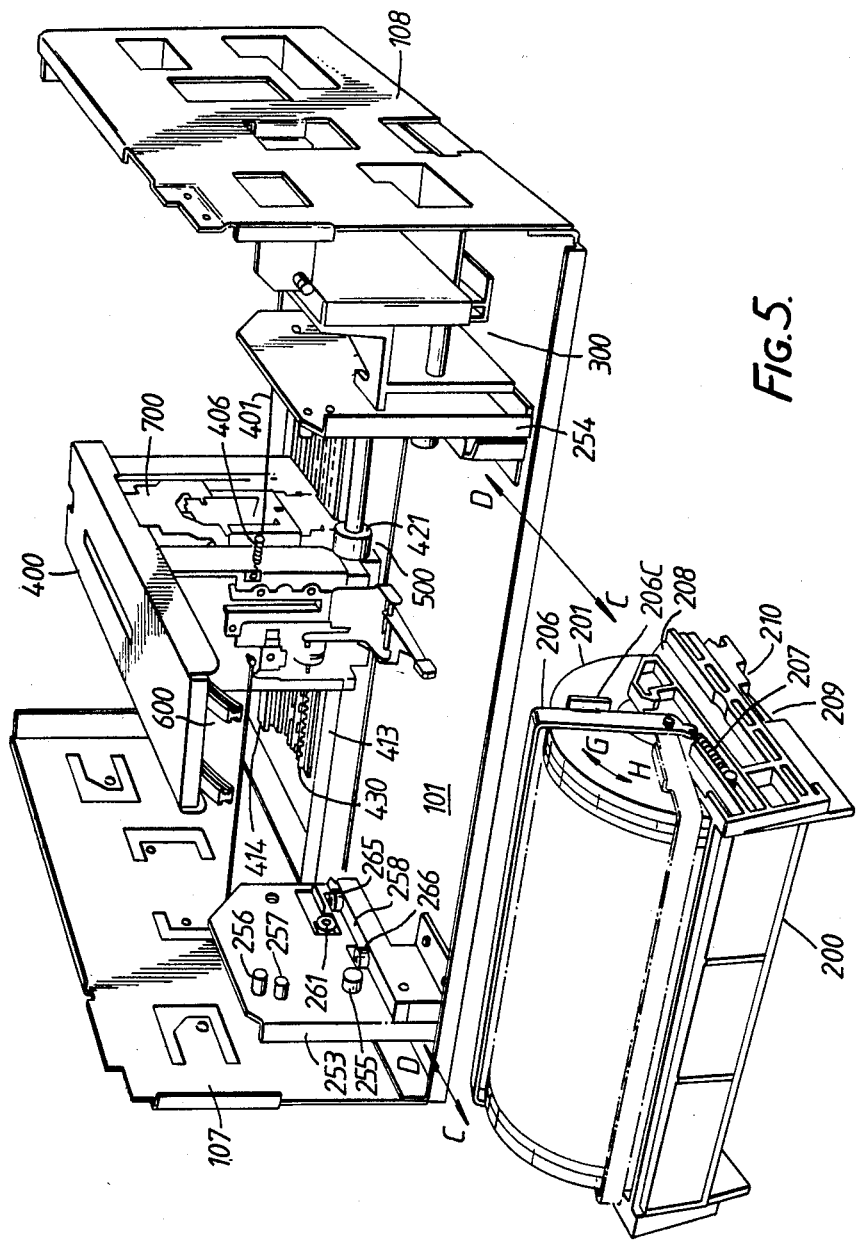
FIG. 5 is a perspective view for illustrating a loading and an unloading of the tray shown in FIG. 3 to or from the autochanger type disc player shown in FIG. 2.
Figure 6:
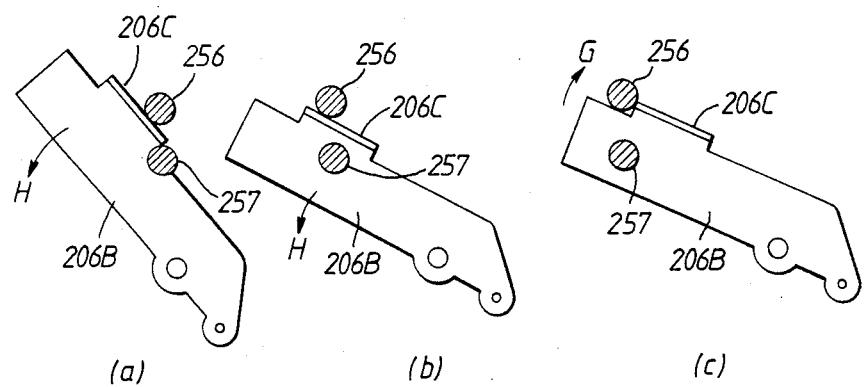
FIGS. 6(a), 6(b) and 6(c) are views illustrating a releasing operation for a disc retention lever of the tray shown in FIG. 5.
Figure 7:
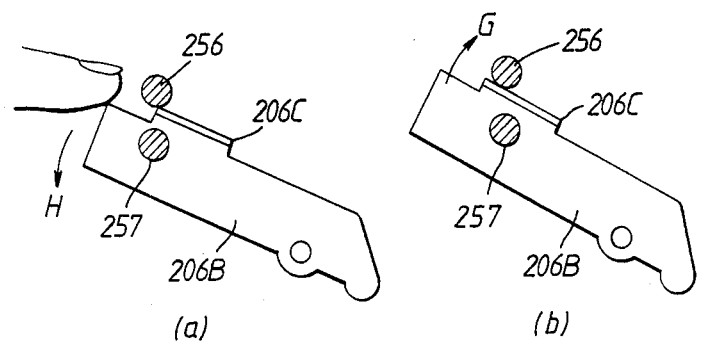
FIGS. 7(a) and 7(b) are views illustrating a setting operation of the disc retention lever of the tray show in FIG. 5.

Referring now to FIGS. 5, 6 and 7, operations of the loading and unloading of the tray 200 is explained. In FIG. 5, a pair of tray supporters 253 and 254 are mounted on the main chassis 106 at the left and right sides. The tray supporters 253 and 254 each include tray guide pin 255, upper engaging pin 256 and lower engaging pin 257 mounted on the inwardly directed face (in FIG. 5, only the pins 255, 256 and 257 on the left-side tray supporter 253 are shown). The upper engaging pins 256 extend longer than the lower engaging pins 257. The tray supporters 253 and 254 further include tray guide rails 258. The upper engaging pin 256 extends for a length to interfere with the side portion 206B of the disc retention lever 206, while the lower engaging pin 257 extends for a length to interfere with the flange 206C but fails to interfere with the side portion 206B.

Before loading of the tray 200, the disc retention lever 206 is pivoted toward the front side of the tray 200 by the biasing force of the spring 207. As a result, all of the discs 201 are retained in the tray 200 by the cross-bar portion 206A of the disc retention lever 206. When the tray 200 is being loaded into the disc storage section 101 along the arrow D in FIG. 5, the flange 206C comes into engagement with the upper lock pin 256. Then the disc retention lever 206 is pivoted in the direction of the arrow H in the drawing to the position indicated a two-dots broken line.

The pivoting operation of the disc retention lever 206 is explained in more detail with reference to FIGS. 6 and 7. First, as shown in FIG. 6(a), the flange 206C comes into engagement with the upper engaging pin 256 and is pivoted in the direction of the arrow H in the drawing. Next, as shown in FIG. 6(b), the disc retention lever 206 is pivoted further in the direction of the arrow H and the flange 206C passes between the engaging pins 256 and 257. Finally, as shown in FIG. 6(c), the flange 206C passes the upper engaging pin 256 so that the disc retention lever 206 is pivoted slightly in the direction of the arrow G due to the biasing force of the spring 207 (see FIG. 3 or 5). In the final condition, the upper engaging in 256 comes into engagement with a step between an edge of the side portions 206B and the foremost end of the flange 206C along the side portion 206B. In this condition, as shown in FIG. 6(c), the tray 200 is stably locked in the disc storage section 101 as show in FIG. 2 and prevented from unwilling movement relative to the tray supporters 253 and 254. Therefore, in the final state shown in FIGS. 2 and 6(c), the discs 201 stored in the tray 200 are free from the disc retention lever 206 to allow the disc transferring mechanism 600 to carry a selected disc 201 to the disc playback mechanism 700 of the disc playback unit 400.

Figure 2:
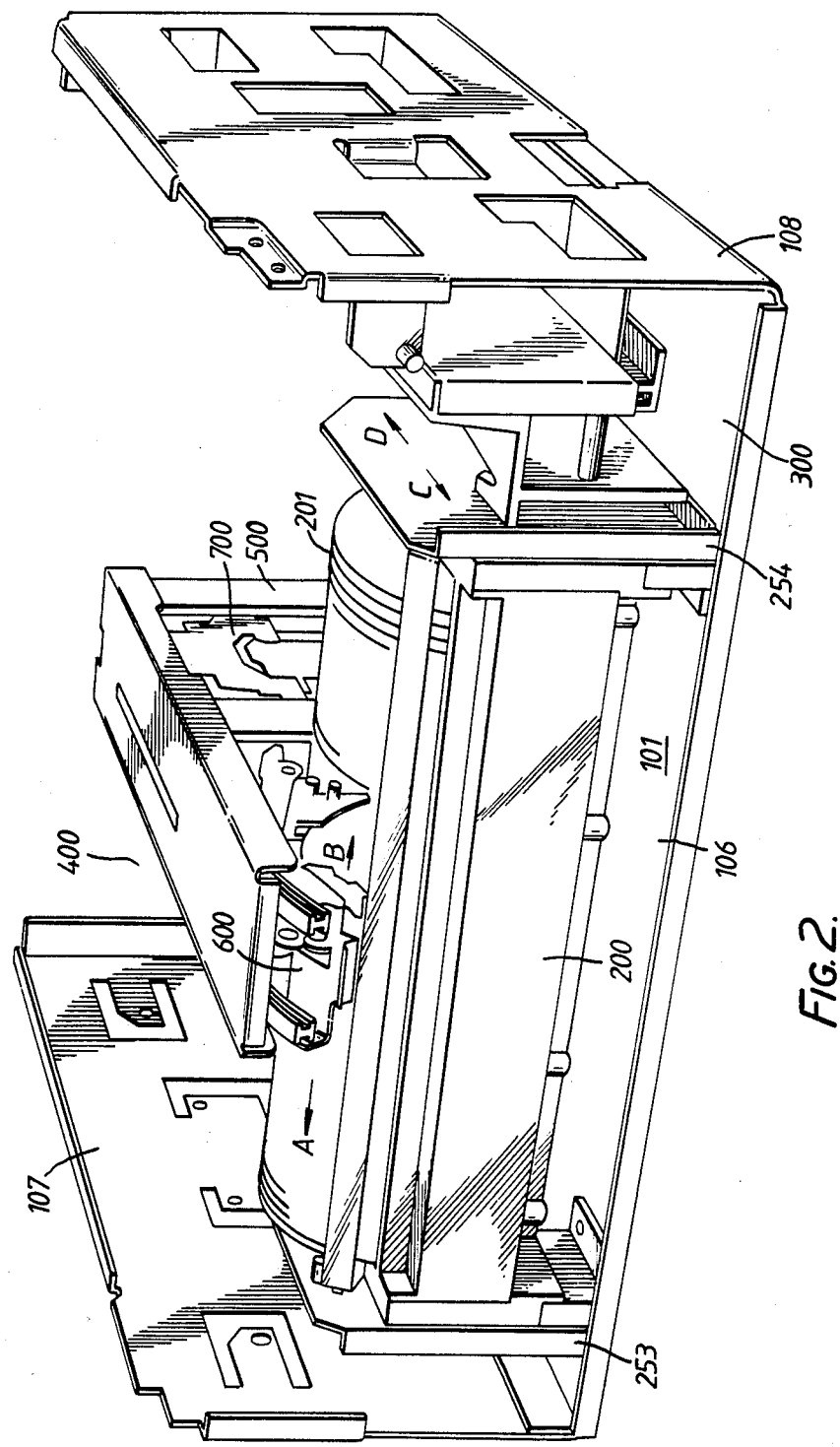
FIG. 2 is a perspective inside view of the autochanger type player shown in FIG. 1.

The unloading operation of the tray 200 is started by manually pressing down the cross-bar portion 206A of the disc retention lever 206 against the biasing force of the spring 207 as shown in FIG. 7(a) and pulling the tray 200 in the direction of the arrow C in FIG. 2. When the disc retention lever 206 is pressed down, the flange 206C engages with the lower engaging pin 257. When the tray 200 is further pulled in the direction of the arrow C in FIG. 2, the flange 206C is forced to pivot in the direction of arrow G as shown in FIG. 7(b) by the lower engaging pin 257. Therefore, immediately after the operator has started the unloading operation, the pivoting movement of the disc retention lever 206 in the direction of the arrow G permits the operator to detach his finger from the cross-bar portion 206A. After the flange 206C passes the lower engaging pin 257, the disc retention lever 206 is pivoted to the position indicated in FIG. 5 according to the biasing force of the spring 207.

Figure 8:
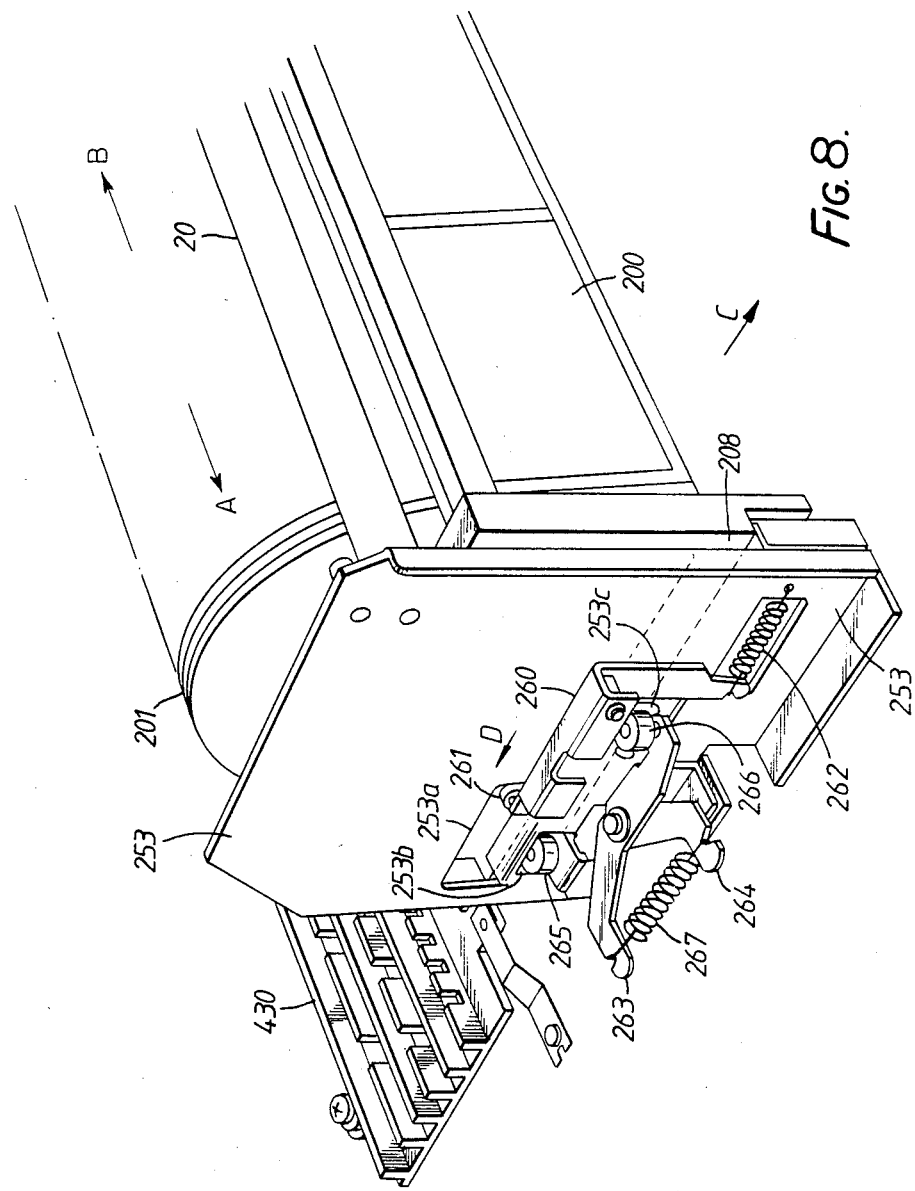
FIG. 8 is a partial perspective view specifically showing a locking mechanism for the tray shown in FIG. 3 in the autochanger type disc player shown in FIG. 2.

Referring now to FIGS. 5 and 8, a securing mechanism for the tray 200 in the disc storage section 101 is explained. As shown in FIG. 8, a slider 260 is mounted to an outer side of the tray supporter 253, opposite to the tray 200. The slider 260 has a roller 261 extending into the disc storage section 101 through a window 253a of the tray supporter 253 and biased toward the direction of the arrow C in the drawing by a spring 262. Further, a pair of levers 263 and 264, having respectively rotatably mounted rollers 266 and 265 on respective one ends thereof, are pivotally mounted on the tray supporter 253 and are arranged in a cross fashion with each other. The other ends of the levers 263 and 264 are connected to each other by a spring 267. The rollers 265 and 266 also extend into the disc storage section 101 through respective windows 253b and 253c of the tray supporter 253. The rollers 265 and 266 are biased toward the disc storage section 101 by the spring 267. Therefore, when the tray 200 has been loaded in the disc storage section 101, the roller 261 of the slider 260 engages and pushes the front end of the tray 200 toward the direction of the arrow C by the biasing force of the spring 262 so that when the tray 200 is fastened in the disc storage section 101, it becomes free from shaking in the direction of the arrows C and D. Also the rollers 265 and 266 rotatably mounted on the levers 263 and 264 press the left side of the tray 200 in the direction B by the biasing force of the spring 267 so that the tray 200 becomes free from shaking in the directions A and B. The securing mechanism is also able to absorb thermal expansion and contraction of the tray 200.

Figure 9:
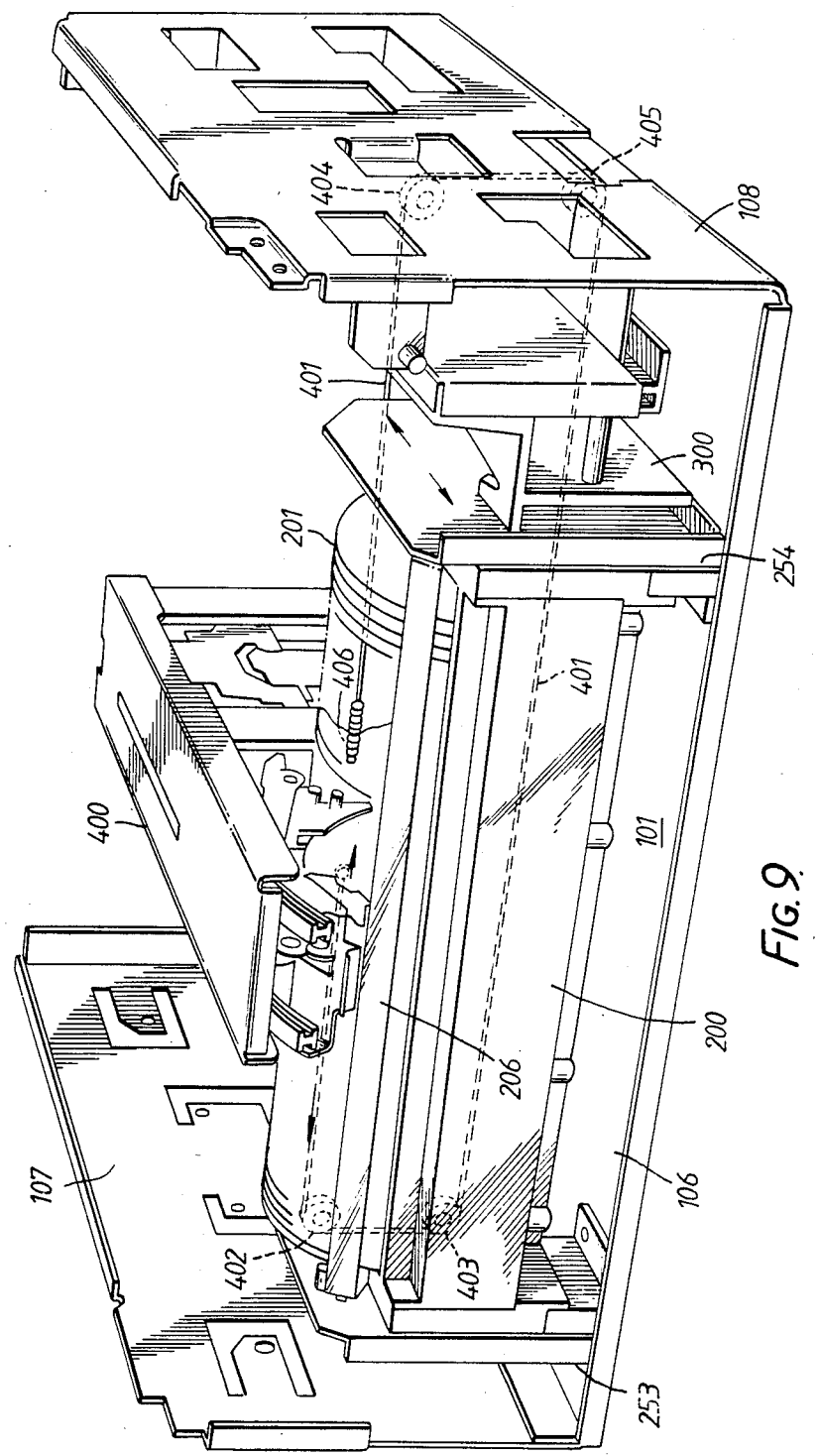
FIG. 9 is a perspective view for illustrating a function of a disc retention wire.

Referring now to FIGS. 5 and 9, a second disc retention mechanism, which operates when the tray 200 is loaded in the disc storage section 101, is explained. As shown in FIG. 9, a wire 401 is guided on rollers 402 and 403 rotatably mounted on the left-side chassis 107 and rollers 404 and 405 rotatably mounted on the right-side chassis 108. One end of the wire 401 is fixed to the disc playback unit 400 directly and the other end is fixed to the disc playback unit 400 via a spring 406. The wire 401 runs in accordance with the movement of the disc playback unit 400 in the directions of arrow A and B along the longitude direction of the tray 200 loaded in the disc storage section 101. Therefore, the wire 401 is sure to interfere with the front of the tray 200 and prevents the discs 201 from falling out of the tray 200, in any position except where the disc playback unit 400 is located. A selected disc 201 is, of course, allowed to be transferred to the disc playback mechanism 700 of the disc playback unit 400.

Figures 10, 11:
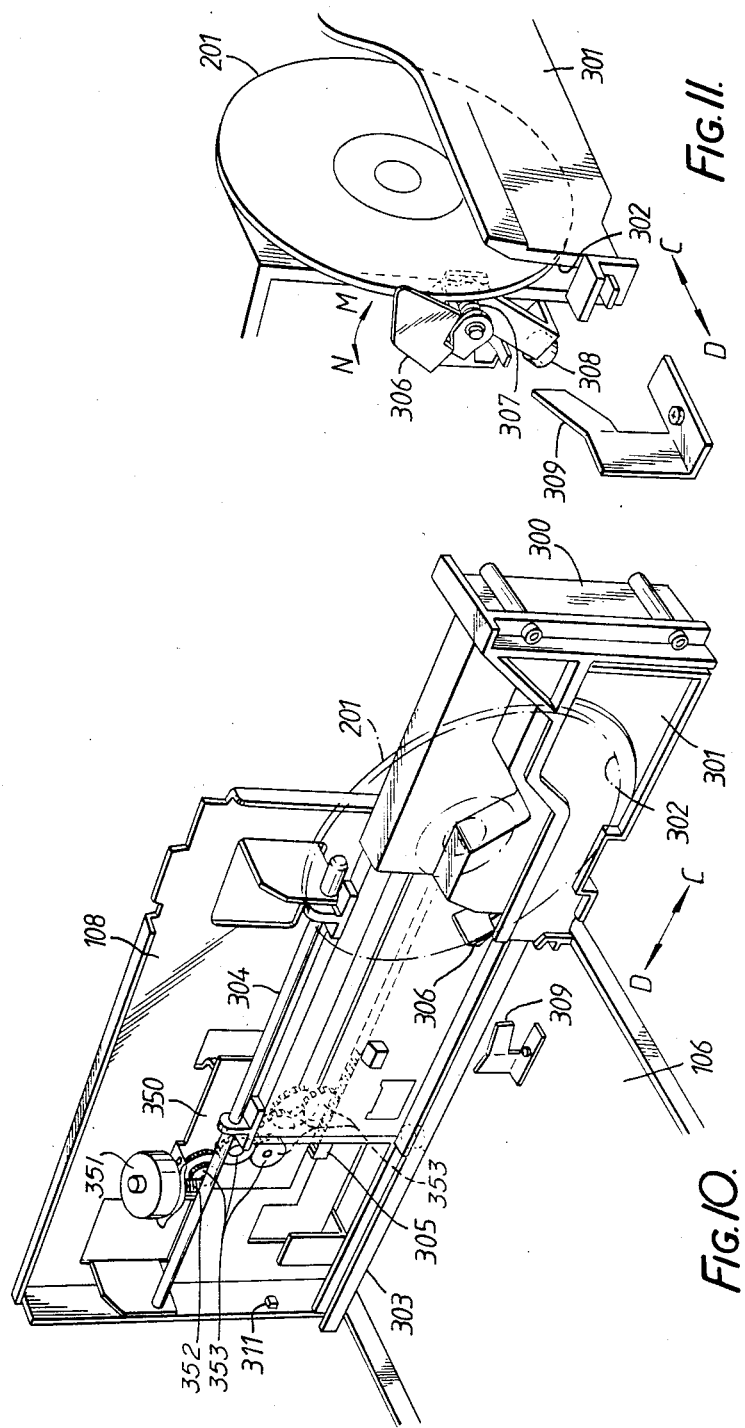
FIG. 10 is a perspective view for illustrating a driving mechanism of a disc temporary loading mechanism shown in FIG. 2.
FIG. 11 is a perspective view for illustrating an operation of a disc retention lever shown in FIG. 10.

Referring now to FIGS. 10 and 11, the disc temporary loading mechanism 300 is explained in detail. As shown in FIG. 10, a disc temporary loader 301 includes a disc holding groove 302 for holding a disc 201 upright. The disc temporary loader 301 is slidably supported on a guide rail 303 and a guide rod 304. The guide rail 303 is mounted on the main chassis 106 along the directions of the arrows C and D in the drawing. Also, the guide rod 304 is mounted on the right-side chassis 108 along the directions C and D. The disc temporary loader 301 is driven to slide along the guide rail 303 and the guide rod 304 by a disc temporary loader driving mechanism 350. The disc temporary loader driving mechanism 350 has a motor 351 which drives the disc temporary loader 301 through a worm gear 352 mounted on a driving shaft of the motor 351, idler gears 353 and a rack 305 formed on the disc temporary loader 301 along the directions C and D. When the disc temporary loader 301 is extending out the front of the housing 100 as shown in FIG. 10, the disc 201 held in the disc holding groove 302 is prevented from falling out of the disc holding groove 302 by a disc retention lever 306. The disc retention lever 306 is pivoted to the disc temporary loader 301 and normally is biased by a spring 307 in the direction of the arrow M to interfere with the front of the disc holding groove 302 as shown in FIG. 11. When, therefore, the disc temporary loader 301 has been driven to the position extending in the front of the housing 101, the disc retention lever 306 is pivoted in the direction of the arrow M, so that the disc retention lever 306 prevents the falling out of the disc 201 from the disc holding groove 302.

Figure 12:
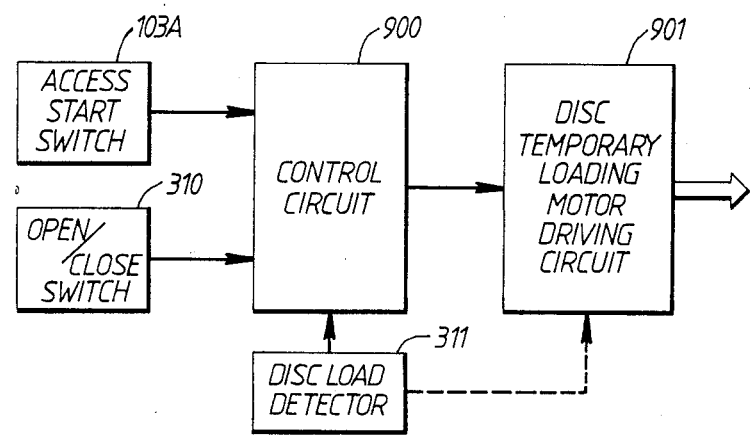
FIGS. 12 and 13 are block diagrams for controlling the autochanger type player shown in FIGS. 1 and 2.

Referring now to FIG. 12, a control circuit for a playback operation of the disc 201 loaded in the disc temporary loading mechanism 300 is explained. A disc temporary loader open/close control switch 310, an access start switch 303A for starting the access operation to any disc 201 held in the tray 200 or the disc temporary loader 301 and a disc temporary loader detection switch 311 are connected to a control circuit 900 comprised of a microprocessor. The disc temporary loader open/close control switch 310 is placed on the front panel of the housing 100 near the disc temporary loading section 102 as shown in FIG. 1 and is manually operable for the control of the disc temporary loader driving mechanism 350 (see FIG. 10). The access start switch 103A is one of the switches among the operation control section 103 (see FIG. 1) for starting the access of the playback operation for the disc 201 held in the disc temporary loader 301. The disc temporary loader detection switch 311 is mounted on the rear end of the right-side chassis 108 as shown in FIG. 10 for detecting a completion of the loading operation of the disc temporary loader 301. The disc temporary loader detection switch 311 is activated when it is depressed by the rear end of the disc temporary loader 301. The control circuit 900 transfers an access signal from the access start switch 103A to a driving circuit 901 for a search operation of the disc playback unit 400. The control circuit 900 is, however, controlled by a signal from the disc temporary loader detection switch 311 so as to hold the access signal from the operation control section 103 until the completion of the loading of the disc temporary loader 301 into the disc temporary loading section 102. Therefore, a malfunction which would arise if the operation control section 103 had been operated prior to the completion of the loading of the disc temporary loader 301 is prevented. The control circuit 900 can be modified so as to accept the access signal from the access start switch 103A when the disc temporary loader detection switch 311 is being actuated.

Figure 13:
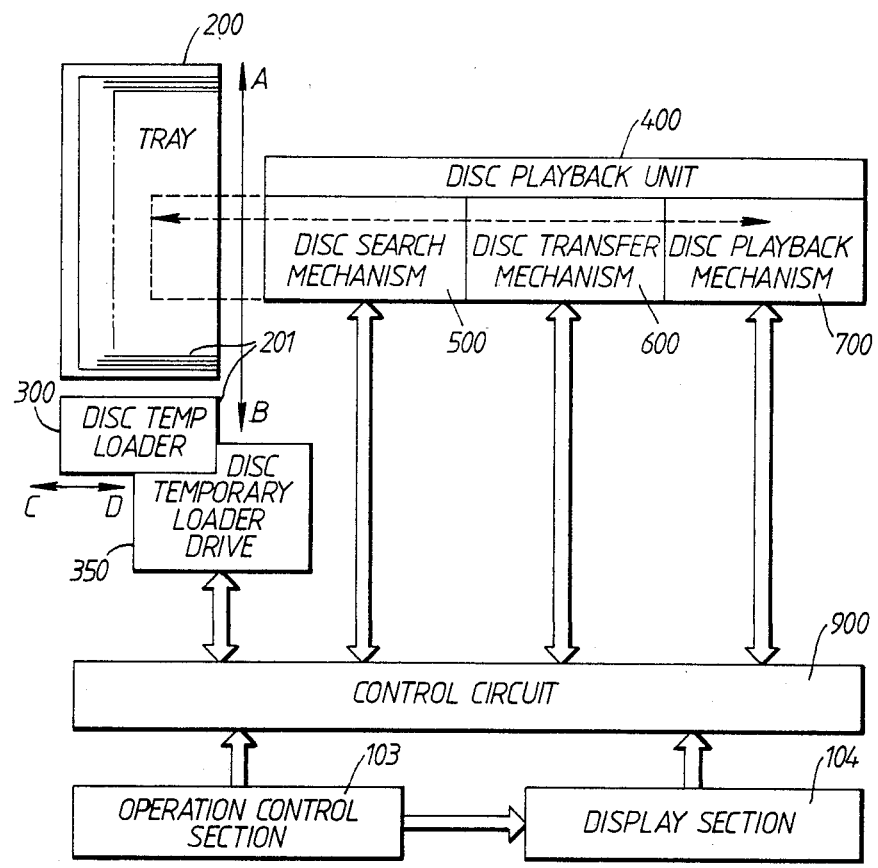

Referring now to FIG. 13 which illustrates diagramatically a control circuit for the disc playback unit 400, a series of operations of the disc playback unit 400, for a playback of any disc 201 held in the tray 200 or the disc temporary loading mechanism 300 which is subjected to the playback operation, are explained. The control circuit 900 is coupled to the disc temporary loader driving mechanism 350, the disc search driving mechanism 500, the disc transferring mechanism 600 and the disk playback mechanism 700 of the disc playback unit 400. The control circuit 900 controls them in accordance with signals from the operation control section 103 on the front panel of the housing 100. The display section 104 on the front panel of the housing 100 (see FIG. 1) is connected to the operation control section 103 and the control circuit 900 to display various information from the operation control section 103 and the control circuit 900. An address signal from the control circuit 900 is applied to the disc search driving mechanism 500. The disc search driving mechanism 500 drives the disc playback unit 400 across the tray 200 and the disc temporary loading mechanism 300 to search any disc 201 which is selected for playback. After the completion of the search operation of the disc search driving mechanism 500, the disc transferring mechanism 600 takes up the selected disc 201 from the tray 200 or the disc temporary loading mechanism 300 and transfers the disc 201 to the disc playback mechanism 700 under the control of the control circuit 900. Then the disc playback mechanism 700 holds the disc 201 for playback operation under the control of the control circuit 900. The control circuit 900 also controls the disc playback mechanism 700 and the disc transferring mechanism 600 of the disc playback unit 400 to return the disc 201 to its original place or other suitable place newly addressed by the control circuit 900 after playback.

Figure 14:
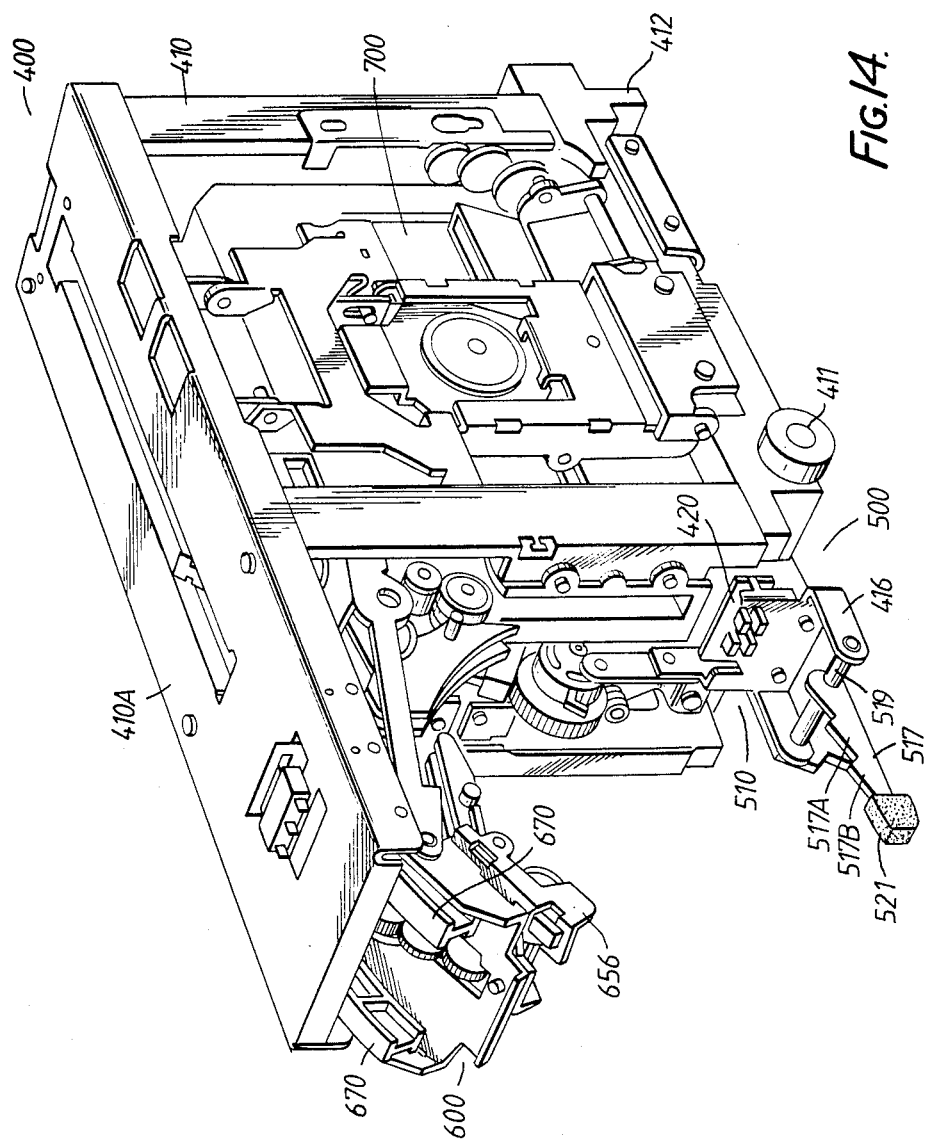
FIG. 14 is a perspective view of the playback unit shown in FIG. 2.
Figure 15:
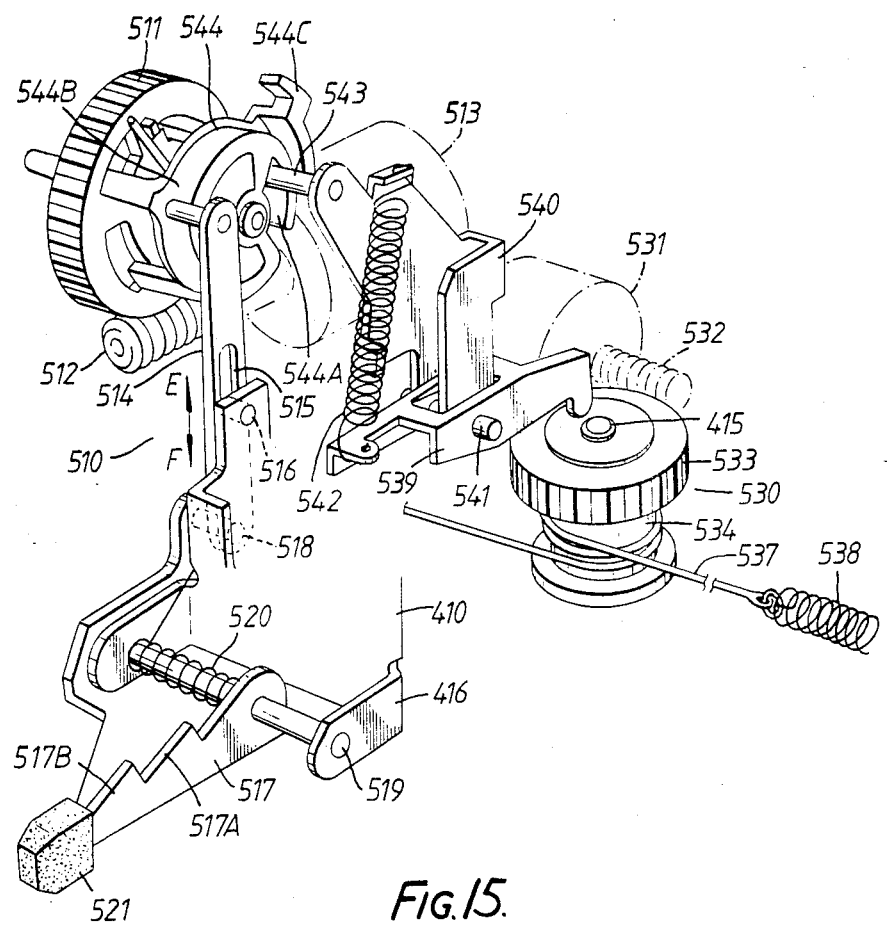
FIG. 15 is a perspective view for illustrating a locating operation and the disc lifting operation of the playback unit shown in FIG. 14.

Referring now to FIGS. 14 and 15, a mechanical structure of the disc playback unit 400 is explained. As shown in FIG. 14, the disc search operation driving mechanism 500 is mounted to a frame 410 in front of the tray 200 loaded in the housing 100. The disc search operation driving mechanism 500 has a disc lifting mechanism 510. Over the disc lifting mechanism 510, the disc transferring mechanism 600 is mounted to the frame 410. Behind the disc search operation driving mechanism 500 and the disc transferring mechanism 600, the disc playback mechanism 700 is mounted to the frame 410. The bottom part of the frame 410 has a bearing 411 and a slider 412. The bearing 411 and the slider 412 are slidably fitting to a guide rod 413 and a guide rail 414 mounted in the housing 100 along the longitude direction of the tray 200 loaded in the housing 100 as shown in FIG. 5. A slit detector 420 comprised of a pair of photo couplers is mounted on the frame 410 near the disc search operation driving mechanism 500. The slit detector 420 faces the slitted flange 204 of the tray 200 loaded in the housing 100 (see FIG. 3) and detects the given slit 205 corresponding to the disc holding groove 202 where the disc 201 selected for playback is held to locate the disc playback unit 400 in an exact position for the selected disc 201. The pair of the photo couplers of the slit detector 420 differentially detect the exact position of the slit 205.

Figure 16:
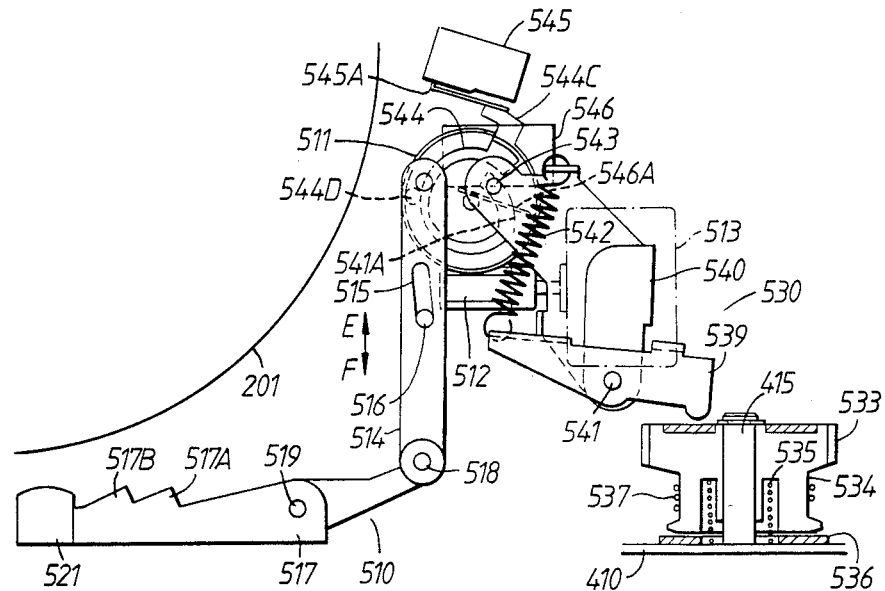
FIG. 16 is a side elevation for illustrating the disc lifting operation of the playback unit shown in FIG. 14.

Referring now to FIGS. 15 and 16, the disc search operation driving mechanism 500 is explained in detail. The disc search operation driving mechanism 500 is comprised of the disc lifting mechanism 510 and a disc search driving mechanism 530. A motor 531 of the disc search driving mechanism 530 is connected to a pulley 534 through a worm gear 532 mounted to a driving shaft of the motor 531 and a worm wheel 533 mounted on the pulley 534. The pulley 534 is pivoted on a shaft 415 mounted on the frame 410 and biased upward by a spring 535. Between the pulley 534 and the frame 410, a friction member 536 is placed. Around the pulley 534 is wound a wire 537 of which one end, e.g., the left end, is fixed to the left-side chassis 107 directly and another end, e.g., the right end, is fixed to the right-side chassis 108 through a spring 538 for absorbing the slack of the wire 537. An upper end of the pulley 534 faces one end of a first brake lever 539. The first brake lever 539 is pivoted on one end of a second brake lever 540 through a pin 541. The first brake lever 539 and the second brake lever 540 are biased in a given relative condition by a spring 542 connected therebetween. Another end of the second brake lever 540 has a pin 543 which engages with a first cam 544A of a cam wheel 544. The cam wheel 544 is fixed to a worm wheel 511 which engages with a worm gear 512 mounted on a driving shaft of a motor 513 in the disc lifting mechanism 510.

The cam wheel 544 has also a second cam 544B. The second cam 544B engages with one end of a lever 514. The lever 514 is mounted to the frame 410 by engagement of its slot 515 with a pin 516 mounted on the frame 410. Another end of the lever 514 is pivotally connected to one end of a disc lifting lever 517 through a pin 518. The disc lifting lever 517 is pivoted at its middle portion to a pair of flanges 416 protruding from the frame 410 through a pin 519 mounted between the flanges 416. The disc lifting lever 517 is biased in one direction along the pin 519 by a spring 520 mounted between the disc lifting lever 517 and one of the flanges 416, e.g., the left-side flange 416, for absorbing the slack of the disc lifting lever 517 along the pin 519. On the other end of the disc lifting lever 517 is mounted an elastic member 521. Along the upper edge of the disc lifting lever 517 are formed a pair of steps 517A, 517B, near the elastic member 521. The steps 517A, 517B respectively fit into the engaging step 210 and the recess 209 of the tray 200 (see FIG. 4) when the disc lift lever 517 is driven to lift up the selected disc 201 held in the tray 200. Therefore, the steps 517A, 517B serve to prevent the tray 200 from being pulled toward the outside of the housing 100 during the operation of the disc lifting mechanism 510. The cam wheel 544 also includes a first engaging member 544C and a second engaging member 544D respectively corresponding to a first switch 545 and a second switch 546 both secured on the frame 410 as shown in FIG. 16. The first switch 545 and second switch 546 are actuated through respective actuating members 545A and 546A being pressed by the first engaging member 544C and the second engaging member 544D in their predetermined rotational positions. Thus, the first switch 545 and second switch 546 detect individually predetermined rotational states of the cam wheel 544.

Figure 17:
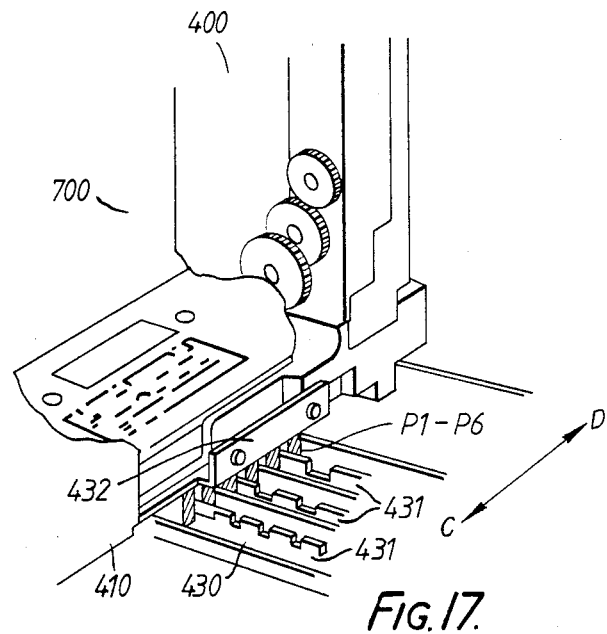
FIG. 17 is a perspective view for illustrating the locating operation of the playback unit shown in FIG. 14.

As structured above, the motor 531 drives the pulley 534 through the worm gear 532 and the worm wheel 533 during the search operation of the disc 201 selected for playback. According to a rotation of the pulley 534, the disc playback unit 400 is driven by the pulley 534 winding the wire 537 along the longitude direction of the tray 200 loaded in the disc storage section 101. Here, as shown in FIG. 5, an address plate 430 is mounted on the main chassis 106 between the guide rod 413 and the guide rail 414. As seen in FIG. 17, the address plate 430 is comprised of a plurality of parallel ridges 431. In the ridges 431 are respectively formed a plurality of slits according to a predetermined pattern. A combination of respective slits of the ridges 431 along the arrows C and D in a given location represents an address code of a corresponding disc holding groove 202 of the tray 200. On the other hand, as shown in FIG. 17, the frame 410 of the disc playback unit 400 includes an address code reader 432 comprised of photosensors $P_1$ to $P_6$ corresponding to the ridges 431 of the address plate 430. The photosensors $P_1$ to $P_6$ are respectively extending between gaps of the ridges 431 and read a given address code coded on the address plate 430.

When the address code reader 432 has read the address code corresponding to the given disc holding groove 202 of the tray 200, the slit detector 420 adjusts the disc playback unit 400 in the exact location for the given disc holding groove 202 through detection of the slit 205 of the slitted flange 204. At the completion of the search operation of the disc search operation driving mechanism 500, the motor 531 stops under the control of the control circuit 900 (see FIG. 13). Then the motor 513 drives the cam wheel 544 in the counterclockwise direction in the drawings (FIGS. 15 and 16) through the worm gear 512 and the worm wheel 511. The first cam 544A of the cam wheel 544 then drives the first brake lever 539 in the clockwise direction through the second brake lever 540. At the same time, the first engaging member 544C of the cam wheel 544 disengages from the actuating member 545A of the first switch 545 so that the first switch 545 is deactivated. The first brake lever 539 driven by the first cam 544A presses the pulley 534 downward against the spring 535 to compress the playback 534 into the friction member 536. Therefore, the movement of disc pulley unit 400 is damped quickly after the completion of the search operation and, further, the disc playback unit 400 is locked in the location until the next search operation.

On the other hand, the second engaging member 544D of the cam wheel 544 presses the actuating member 546A of the second switch 546 due to the further rotation of the cam wheel 544 in the counterclockwise direction in the drawings so that the second switch 546 is activated. At the same time, the second cam 544B of the cam wheel 544 depresses the lever 514 in the direction of the arrow F in the drawings. Accordingly, the disc lifting lever 517 is pivoted around the pin 519 in the clockwise direction. The elastic member 521, then, penetrates into the recess 209 of the tray 200 (see FIG. 4) so that the disc 201 in the disc holding groove 202 at the location of the given address is lifted from the disc holding groove 202. The disc 201 lifted is then carried into the disc playback mechanism 700 by the disc transferring mechanism 600.

Figure 18:
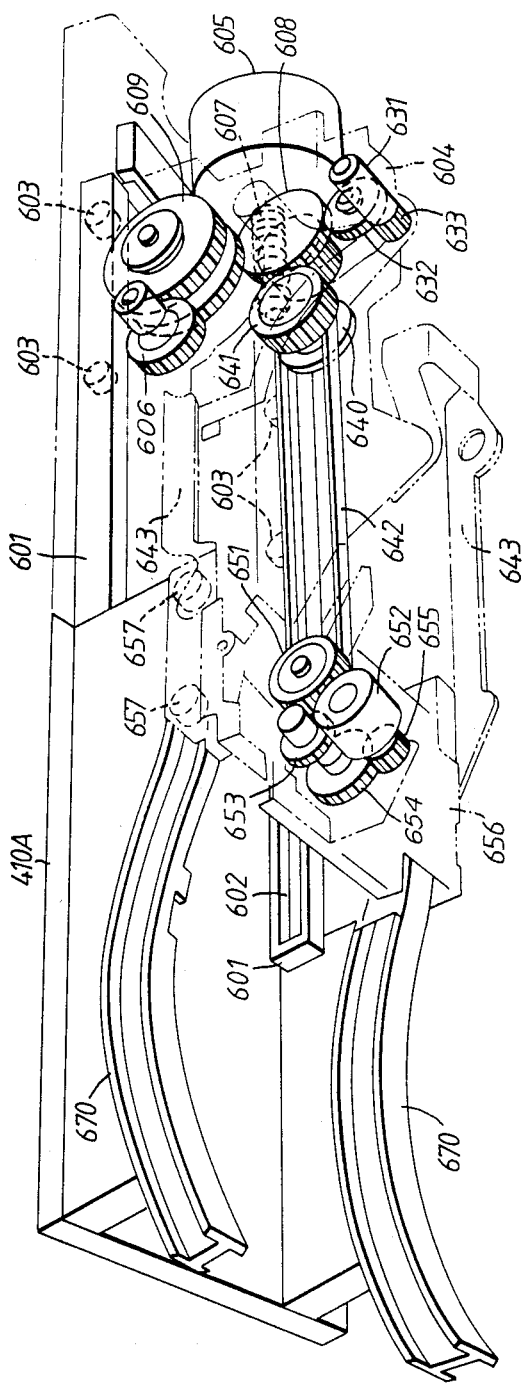
FIGS. 18 and 19 are perspective views of a disc transferring mechanism of the playback unit shown in FIG. 14.
Figure 19:
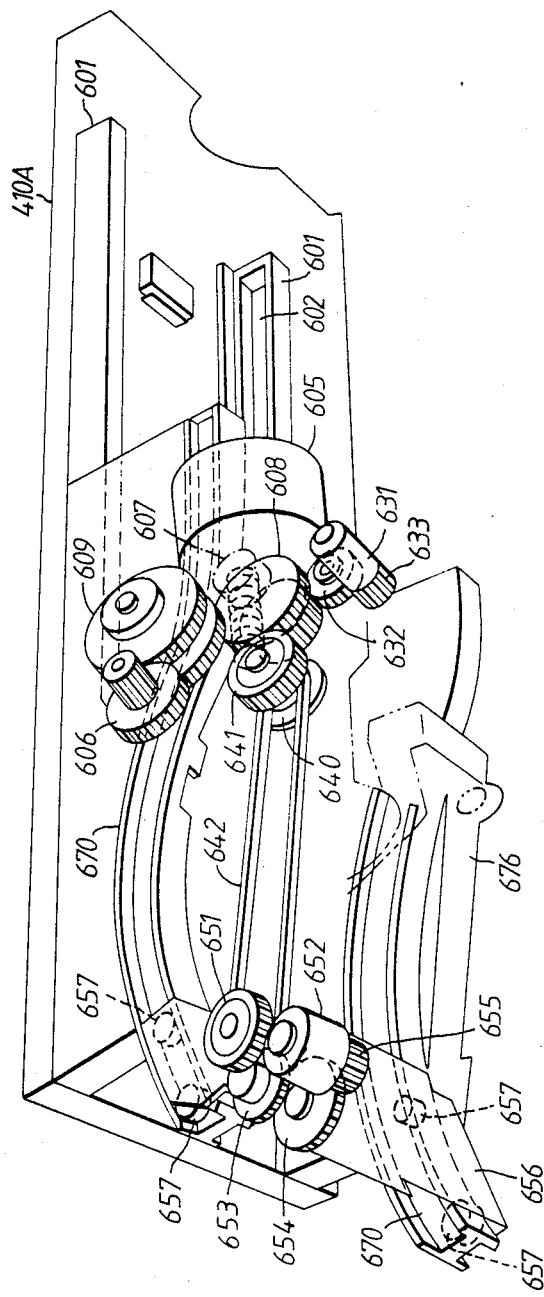

Referring now to FIGS. 18 and 19, the disc transferring mechanism 600 is explained in detail. A pair of rack gears 601 are parallelly mounted at the back of an upper part 410A of the frame 410 along the longitude direction of the disc playback unit 400, that is, in the direction of the arrows C and D in the drawing FIG. 5. The rack gears 601 each include a guide groove 602. The guide groove 602 of each rack gear 601 guides rollers 603 of a first support base 604 (shown with two-dots broken line in FIG. 18), which is hung on the rack gear 601 through the rollers 603. The first support base 604 has a motor 605. The motor 605 is coupled to a first gear 606 through worm gear 607 on a driving shaft of the motor 605, a worm wheel 608 and a clutch gear 609. The first gear 606 engages with the right-side rack gear 601 and drives the first support base 604 along the rack gears 601. On the other hand, the motor 605 is coupled to a roller 631 through the worm gear 607, the worm wheel 608, an idler gear 632 and a drive gear 633. The roller 631 is made of elastic material and is a part of a second disc transfer section 630 for transferring the disc 201 from the disc playback mechanism 700 to the tray 200 as described later. Further, the motor 605 is coupled to a pulley 640 through the worm gear 607, then the worm wheel 608 and a drive gear 641 coaxial to the pulley 640. The pulley 640 is coupled through a belt 642 to a pulley coaxial with a gear 651 which constitutes a part of a first disc transfer section 650 for transferring the disc 201 into the disc playback mechanism 700 as described later. The gear 651 is coupled to a roller 652 through idler gears 653, 654 and a drive gear 655 coaxial to the roller 652. The roller 652 is made of elastic material like the roller 631. The first disc transfer section 650 is mounted on a second support base 656 (shown partially with a two-dots broken line in FIG. 18), which is coupled to the first support base 604 through a pair of links 643 so that the first disc transfer section 650 is driven together with the second disc transfer section 630 along the longitude direction of the disc playback unit 400. The second support base 656 is hung on a pair of curved rails 670 through a pair of rollers 657 for each curved rail 670 so that the second disc transfer section 650 makes a curve along the curved rails 670 during its movement.

Figure 20:
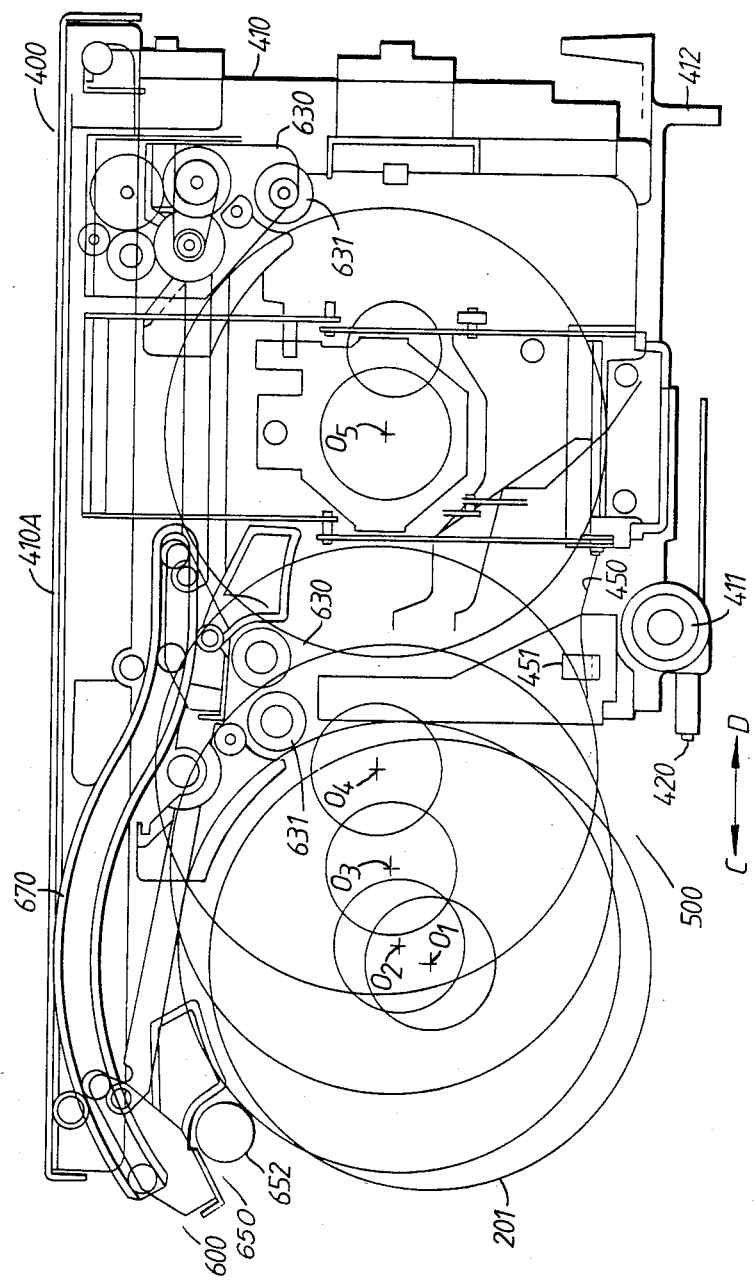
FIG. 20 is a cross section for illustrating the disc transferring operation of the playback unit shown in FIG. 14.
Figure 21:
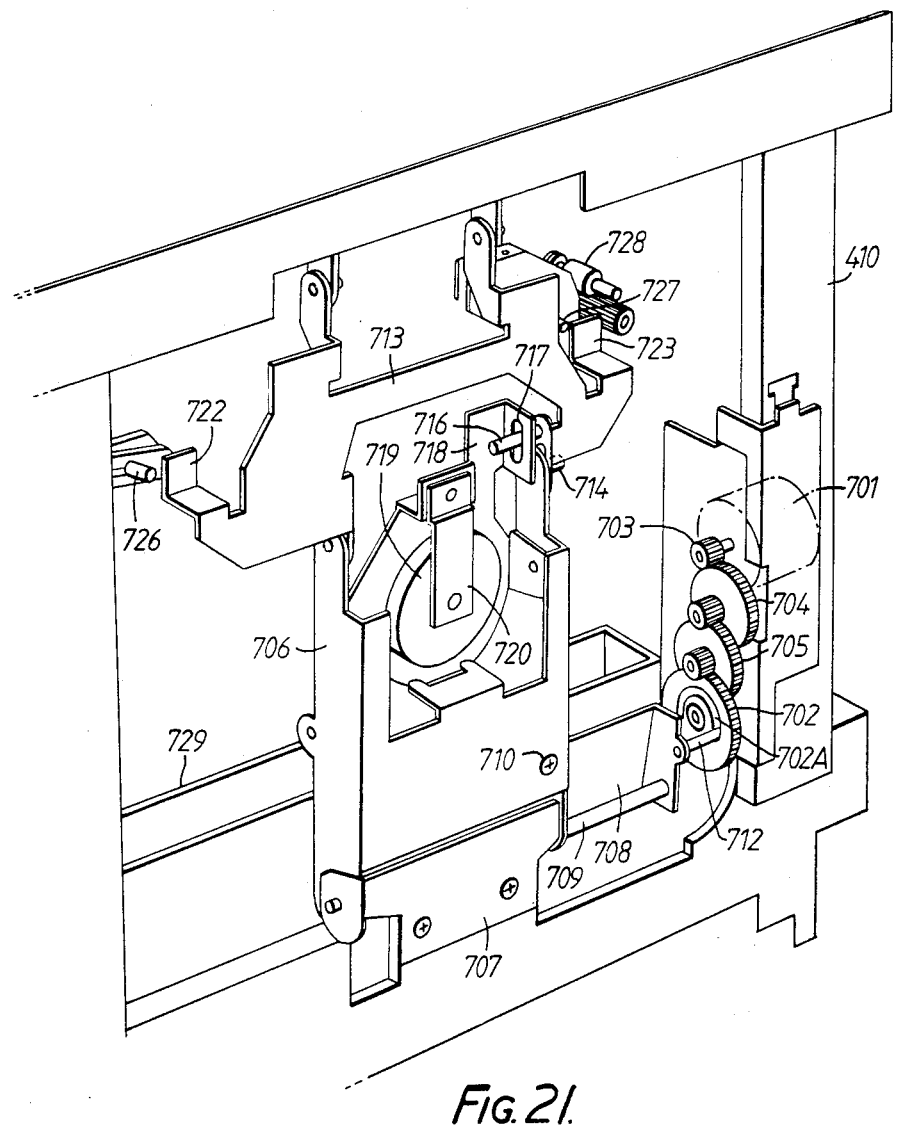
FIGS. 21 and 22 are side elevations of the disc clamping mechanism shown in FIG. 14.
Figure 22:
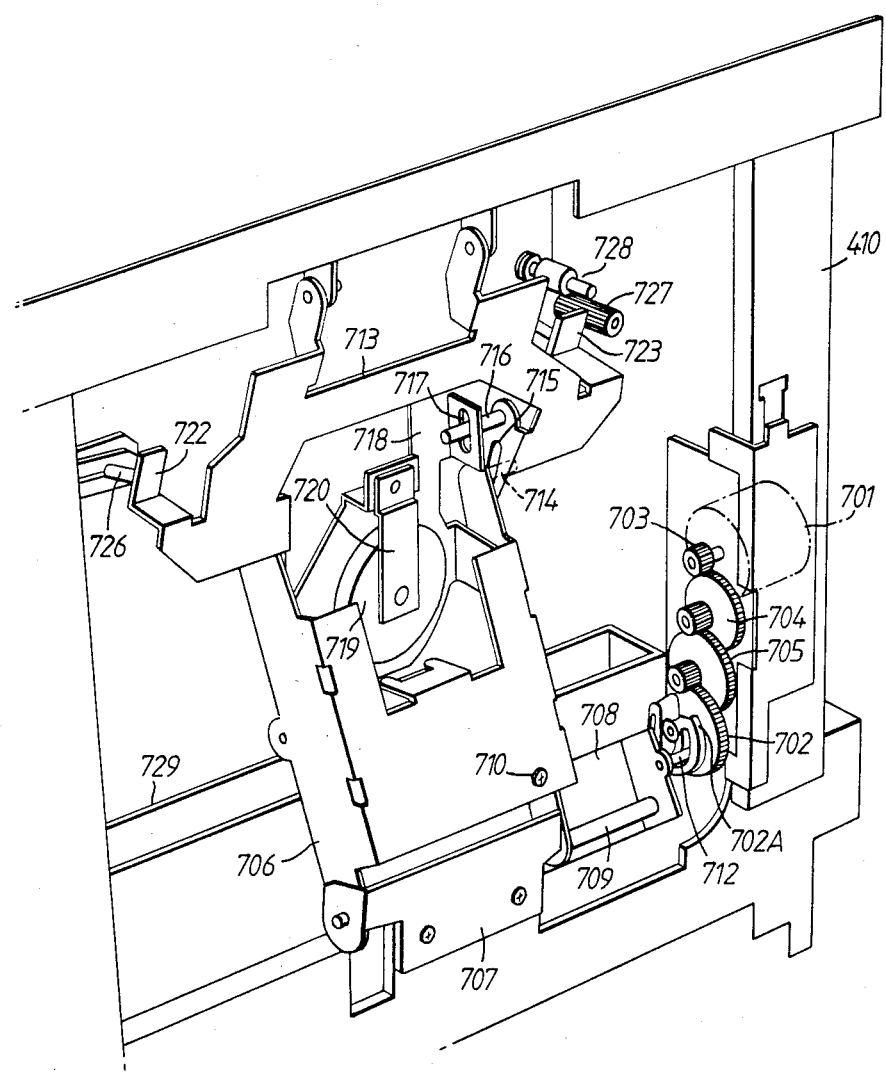

Referring now to FIG. 20, the operation of the disc transferring mechanism 600 as constructed above is explained in detail. In a start of the disc loading operation into the disc playback mechanism 700, the disc transferring mechanism 600 is located in the forefront of the disc playback unit 400 as shown in FIG. 19. Prior to the operation of the disc transferring mechanism 600, the disc 201 is lifted by the disc search operation driving mechanism 500 from a position $O_1$ held in the tray 200 ($O_1$ through $O_5$ indicate the positions of the center of the disc 201 during its transfer from the tray 200 to playback mechanism 700) to a position $O_2$. In the position $O_2$, the disc 201 engages with the disc transferring mechanism 600. In more detail, the periphery of the disc 201 engages with the roller 652 of the first disc transfer section 650 and the roller 631 of the second disc transfer section 630 together. Then the motor 605 rotates the rollers 652, 631 in the counterclockwise direction in the drawing and also rotates the first gear 606 in the counterclockwise direction. Therefore, the disc transferring mechanism 600 cause the disc 201 lifted in the position $O_2$ to roll out clockwise from the tray 200 through the rotations of the rollers 652, 631 and transfers the disc 201 to positions $O_3$, $O_4$ in succession according to the drive of the first gear 606. After the disc 201 rolls over a bank 450 formed in a disc transfer path of the disc playback unit 400, the disc 201 rolls into the position $O_5$ in the disc playback mechanism 700 due to its own weight. When the disc 201 passes the bank 450, a disc passage detector 451 mounted on the frame 410 in front of the disc transfer path detects the passage of the disc 201 and activates the disc play back mechanism 700 to play back the disc 201. After the completion of the playback of the disc 201, the motor 605 rotates the rollers 652, 631 and the first gear 606 in the clockwise direction contrary to the aforesaid operation for transferring the disc 201 into the disc playback mechanism 700. Therefore, the disc transferring mechanism 600 engages with the periphery of the disc 201 at the rollers 652, 631 and transfers the disc 201 into the tray 200 by making the disc 201 rolling the counterclockwise direction.

Figure 23:
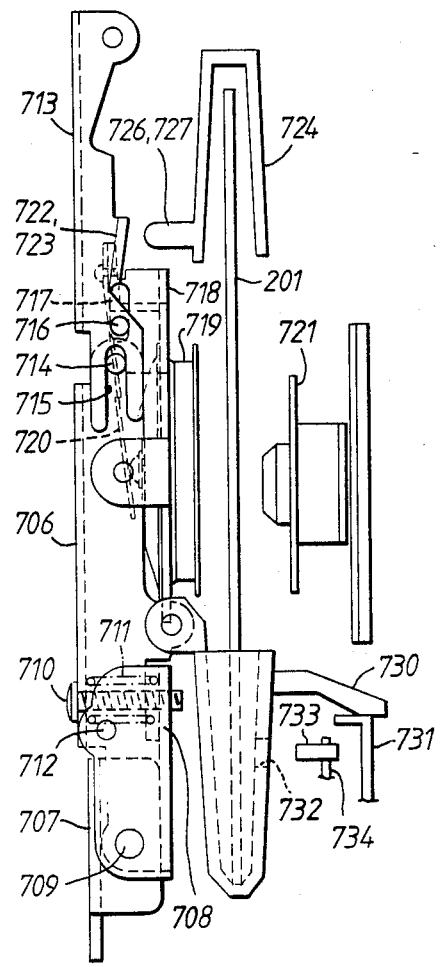
FIGS. 23 and 24 are cross sections of the disc clamping mechanism shown in FIG. 14.
Figure 24:
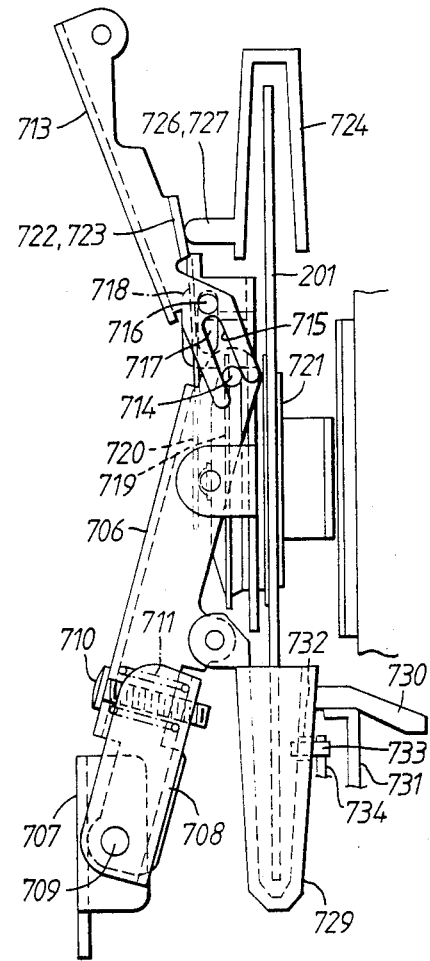

Referring now to FIGS. 21 to 24, an operation of clamping the disc 201 to a turntable in the disc playback mechanism 700 is described. On the frame 410 is mounted a motor 701. The motor 701 is coupled to a cam gear 702 through a drive gear 703 secured to a driving shaft of the motor 701 and idler gears 704, 705. A clamp lever 706 is pivoted to a mount 707 secured to the lower part of the frame 410 together with an adjust lever 708 through a shaft 709. The clamp lever 706 and the adjust lever 708 are coupled to each other with an adjust screw 710 and a spring 711 as shown in FIGS. 23 and 24. A pin 712 protruding from the adjust lever 708 engages with a cam 702A on the cam gear 702. Therefore, the coupling condition between the clamp lever 706 and the adjust lever 708 is adjustable through adjusting the adjust screw 710. On the other hand, a guide lever 713 is pivoted on an upper part of the frame 410. Free ends of both the clamp lever 706 and the guide lever 713 are coupled to each other through a pin-slot connection due to a pin 714 mounted on the clamp lever 706 and a slot 715 formed in the guide lever 713. The guide lever 713 includes a pin 716 near the slot 715. The pin 716 engages with a slot 717 formed in a clamper holder 718. The clamper holder 718 holds a clamper 719 rotatably mounted on a clamper holder 718 and biases the clamper 719 inward toward the disc playback mechanism 700 through a leaf spring 720. The clamper 719 is magnetized so that it attracts a turntable 721 made of magnetic material, e.g., iron. The guide lever 713 has further a pair of engaging parts 722, 723 which are opposite engaging pins 726, 727 of a disc guide 724 for guiding an upper part of the disc 201 in standing upright. The disc guide 724 is held in the disc playback mechanism 700 to be movable perpendicularly to the turntable 721 but biased by a biasing device 728 to a position apart from the turntable 721 as shown in FIG. 23. Below the disc guide 724, a disc holder 729 is pivotally held at its upper left-side in the drawings (FIGS. 23 and 24) by the clamp lever 706. The disc holder 729 also has an arm 730 protruding from its upper right side in the drawing. The arm 730 inclines downward gradually and has a flat bottom portion at its end. The arm 730 engages with a guide 731 mounted on the frame 410 so that the disc holder 429 is kept almost vertical in any position of the disc holder 729 being carried by the clamp lever 706. By the way, the disc holder 729 descends or ascends gradually between the positions as shown in FIGS. 23 and 24 in accordance with the pivoting movement of the clamp lever 706 and the inclined portion of the arm 730 engaging with the guide 731. The disc holder 729 further includes a hole 732 in its right wall for accommodating a photosensor 733 when the disc holder 729 moves inward toward the disc playback mechanism 700. The photosensor 733 is mounted on a stand 734 held on the frame 410 and detects whether the disc 201 is or isn't clamped on the turntable 721. Therefore, the disc playback mechanism 700 is able to automatically start the playback operation of the disc 201 clamped on the turntable 721 according to a detecting result of the photosensor 733.

As the disc playback mechanism 700 is constructed as above, the motor 701 is activated automatically in succession to the disc passage detector 451 having detected a passage of the disc 201 to the disc playback mechanism 700. The motor 701 drives the clamp lever 706 to pivot toward the turntable 721 through the cam gear 702. At the same time, the guide lever 713 also pivots toward the turntable 721 according to the pin-slot coupling between the clamp lever 706 and the guide lever 713. The guide lever 713 carries the clamper holder 718 toward the turntable 721 so that the clamper 719 presses the disc 201 against the turntable 721. The clamp lever 706 carries the disc holder 729 inward. For a little moment the disc holder 729 moves toward the turntable 721 without descending because of the flat base portion of the end of the arm 730 being held on the guide 731, so that the center hole of the disc 201 held in the disc holder 729 fits on a center spindle of the turntable 721. After that, the disc holder 729 gradually descends according to the pivoting of the clamp lever 706 and the inclined portion of the arm 730 engaging with the guide 731. When the clamper 719 has been carried inward with the clamper holder 718 a predetermined distance, the clamper 719 is drawn toward the turntable 721 by the magnetic attraction between the clamper 719 and the turntable 721. Therefore, the clamper 719 clamps the disc 201 on the turntable 721 firmly by the magnetic attraction only. This causes the biasing force of the leaf spring 720 against the clamper 719 to be increased, and the clamper 719 becomes free from the friction between the clamper holder 718 and the clamper 719. When the disc 201 is clamped on the turntable 721, the photosensor 733 detects the disc 201 and allows the disc playback mechanism 700 to start the playback operation of the disc 201.

After the completion of the playback operation for the disc 201, an operation for releasing the disc 201 from the turntable 721 starts. In the releasing operation, the motor 701 drives the cam gear 702 to rotate oppositely for the aforesaid clamping operation. The cam gear 702 pivots the clamp lever 706 and the guide lever 713 outward from the disc playback mechanism 700. According to the movements of the clamp lever 706 and the guide lever 713, the clamper 719 is pulled apart from the turntable 721 against the magnetic attraction and also the disc guide 724 and the disc holder 729 are returned back to the positions as shown in FIG. 23. The disc 201 is then returned back together with the disc holder 729. When the disc releasing operation from the turntable 721 has been completed, the disc transferring mechanism 600 carries the disc 201 into the tray 200 as aforementioned It is obvious that the invention is not limited to the embodiment specifically described and shown, but rather various modifications and changes may be made thereto without departing from the spirit and the scope of the invention.

What is claimed is:

1. An autochanger type disc player for selectively playing a disc stored therein, said disc player comprising:
    disc playback means;
    disc storage means for holding a plurality of discs upright and parallel to each other therein and for allowing said discs to go into or out of said disc storage means, said disc storage means including a plurality of disc holding grooves and partition walls dividing said disc holding grooves from each other, the bottom of each of said disc holding grooves being curved in an arc of a radius approximately equal to the radius of the periphery of said discs and the upper edges of said partition walls being more inclined toward the direction of movement of said discs into said disc holding grooves than an imaginary line tangent with the periphery of one of said discs at any point where said periphery intersects said upper edges, said discs going into said disc holding grooves smoothly without the peripheries of said discs running against said upper edges; and
    disc transferring means for transferring said discs between said disc playback means and said disc storage means.

2. The autochanger type disc player of claim 1, wherein said bottoms of said disc holding grooves extend over an arc having a length approximately equal to one fourth of the circumference of said discs.

* * * * *